(No Model.)
J. L. BORSCH.
SKIN PROTECTOR FOR SPECTACLE TEMPLES.
No. 427,252. Patented May 6, 1890.
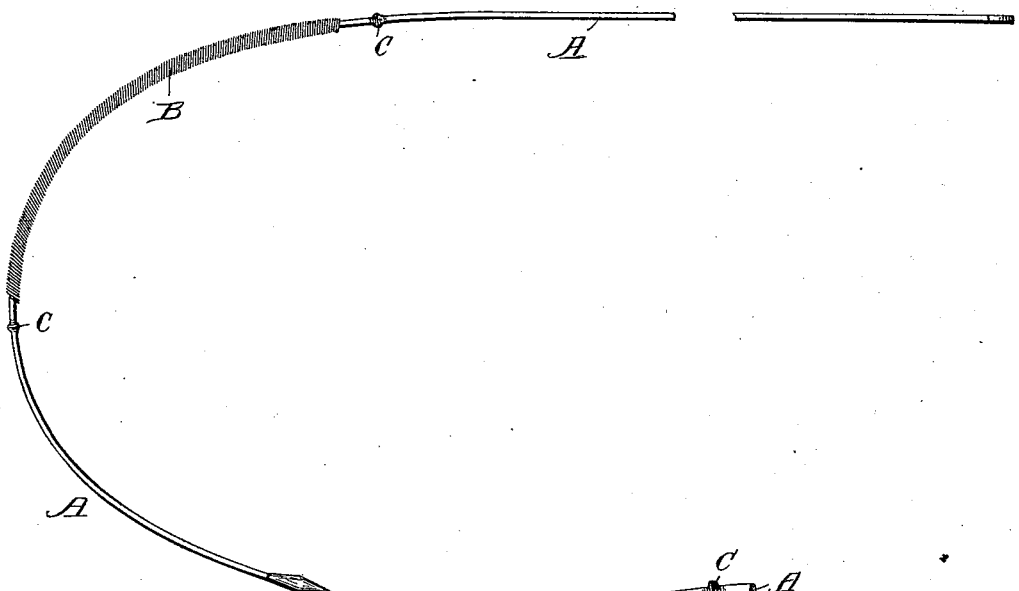
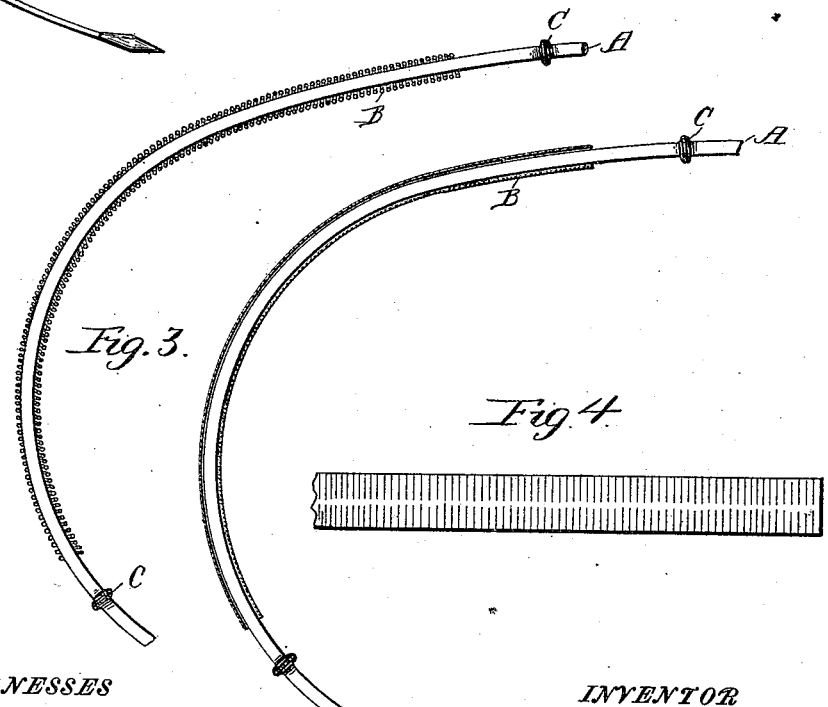
WITNESSES
Wm. T. Robertson
Frank W. White
INVENTOR
John L. Borsch
By T. J. W. Robertson
Attorney

UNITED STATES PATENT OFFICE.

JOHN L. BORSCH, OF PHILADELPHIA, PENNSYLVANIA.

SKIN-PROTECTOR FOR SPECTACLE-TEMPLES.

SPECIFICATION forming part of Letters Patent No. 427,252, dated May 6, 1890.

Application filed February 8, 1890. Serial No. 339,729. (No model.)

*To all whom it may concern:*

Be it known that I, JOHN L. BORSCH, a citizen of the United States, residing at Philadelphia, in the county of Philadelphia and State of Pennsylvania, have invented certain new and useful Improvements in Skin-Protectors for Spectacle-Temples, of which the following is a specification, reference being had therein to the accompanying drawings.

This invention relates to that class of spectacles provided with temples, and more particularly to those temples having their ends curved to pass downward behind the ears.

It has been found that many people have skin (and especially that behind the ears) so tender and delicate that the least motion of the "temples" irritates the skin and makes it sore, and especially is this the case in very warm weather, when perspiration assists in keeping the skin soft and tender, and, moreover, frequently adds to the irritation by its acrid nature, so that bad sores often result from the use of temples, especially hook-temples, although for other reasons such hook-temples are much preferred to the old-fashioned comparatively straight temples. I have found that this irritation is caused mostly by the motion due to the muscles of the face in laughing, talking, the movements of the nose and eyebrows, &c., and have found that it may be prevented by the use of shields or protectors around said temples so made that while the protectors rest firmly in position behind the ears the temples move freely through them as the spectacles are moved by the muscles of the face, and thus no irritation is caused to the skin.

My invention therefore consists in a skin-protector for spectacle-temples, as hereinafter set forth and then definitely claimed.

Figure 1 represents a side view of a temple provided with my improvement; Fig. 2, a longitudinal section of part of a temple on an enlarged scale; Fig. 3, a similar view of a modification. Fig. 4 is a plan of a blank from which the modified form of my improvement shown in Fig. 3 may be made.

Referring now to the details of construction, A represents the temple, and B the shield surrounding the temple. This I prefer to make in the form of a spiral spring coiled so as to loosely fit the temple, and preferably bent to substantially the same curve as the temple before it is put on the same.

At C are shown small beads to prevent the protectors from moving too far out of place.

Instead of the springs, I may use tubes of any suitable material curved to shape, as shown in Fig. 3. In making these tubes I prefer to make them out of sheet metal having a series of cuts or slits on the edge and bent to form a tube. These cuts or slits on the edge will allow of the tube readily bending to the shape desired. I may also use solid tubes without cuts or slits.

These protectors may be made of any desired material, and may be plated with non-corrosive metal to prevent oxidation, if made of oxidizable material.

When these protectors are worn, they rest against the skin between the ear and the head, and as the spectacles are moved by the muscles of the face the temples slip through the protectors, and thus there is no irritation of the skin, for the temples rub against the inside of the protector, instead of rubbing against the skin, and thus all irritation and consequent soreness of the skin is prevented.

It will be seen that both forms of my invention form tubes, one being a tube formed of wire wound spirally, while the other is formed of sheet metal or other suitable material bent to shape.

What I claim as new is—

1. A skin-protector for spectacle-temples constructed to receive said temples and allow them to move therein, substantially as described.

2. A skin-protector for spectacle-temples in the form of a tube constructed to loosely surround the temple, substantially as described.

3. A tubular skin-protector formed of a spiral spring, in combination with spectacle-temples adapted to slide through the same, substantially as described.

In testimony whereof I affix my signature, in presence of two witnesses, this 7th day of February, 1890.

JOHN L. BORSCH.

Witnesses:
THEO. H. MCCALLA,
E. HOWARD BURKE.